United States Patent
Sundara et al.

(10) Patent No.: US 9,926,202 B2
(45) Date of Patent: Mar. 27, 2018

(54) GRAPHENE QUANTUM DOTS, THEIR COMPOSITES AND PREPARATION OF THE SAME

(71) Applicant: INDIAN INSTITUTE OF TECHNOLOGY MADRAS, Chennai (IN)

(72) Inventors: Ramaprabhu Sundara, Chennai (IN); Tessy Theres Baby, Chennai (IN); Adarsh Kaniyoor, Chennai (IN)

(73) Assignee: Indian Institute of Technology Madras, Chennai (IN)

( * ) Notice: Subject to any disclaimer, the term of this patent is extended or adjusted under 35 U.S.C. 154(b) by 0 days.

(21) Appl. No.: 14/912,363

(22) PCT Filed: Aug. 14, 2014

(86) PCT No.: PCT/IB2014/063909
§ 371 (c)(1),
(2) Date: Feb. 16, 2016

(87) PCT Pub. No.: WO2015/022661
PCT Pub. Date: Feb. 19, 2015

(65) Prior Publication Data
US 2016/0207775 A1    Jul. 21, 2016

(30) Foreign Application Priority Data
Aug. 16, 2013 (IN) .......................... 3641/CHE/2013

(51) Int. Cl.
*C01B 31/04* (2006.01)
*C09K 11/65* (2006.01)
(Continued)

(52) U.S. Cl.
CPC .......... *C01B 31/0484* (2013.01); *B82Y 30/00* (2013.01); *C01B 32/16* (2017.08);
(Continued)

(58) Field of Classification Search
CPC ......... B82Y 30/00; B82Y 40/00; B82Y 20/00; C01B 31/0226; C01B 31/0476;
(Continued)

(56) References Cited

U.S. PATENT DOCUMENTS 7,785,492 B1    8/2010  Jang et al.
2001/0054377 A1  12/2001  Lindfors et al.
(Continued)

FOREIGN PATENT DOCUMENTS

CN    102001642 A    4/2011
CN    102807209 A    5/2012
(Continued)

OTHER PUBLICATIONS

Yu, et al., Tuning the Graphene Work Function by Electric Field Effect, Nano Letters 2009 9(10): 3430-3434.*
(Continued)

*Primary Examiner* — Daniel C McCracken
(74) *Attorney, Agent, or Firm* — Moritt Hock & Hamroff, LLP; Steven S. Rubin, Esq.

(57) ABSTRACT

Procedures for the synthesis of zero dimension GQDs based on exfoliation/reduction of surface passivated functionalized graphite oxide (f-GO PEG) are described. The synthesis procedures can include exfoliation/reduction f-GO PEG in presence of hydrogen gas, using focused solar radiation and under vacuum.

26 Claims, 11 Drawing Sheets

(51) Int. Cl.

| | |
|---|---|
| B82Y 30/00 | (2011.01) |
| C01B 32/16 | (2017.01) |
| C01B 32/184 | (2017.01) |
| C01B 32/192 | (2017.01) |
| C01B 32/194 | (2017.01) |
| B82Y 20/00 | (2011.01) |
| B82Y 40/00 | (2011.01) |

(52) U.S. Cl.
CPC .......... *C01B 32/184* (2017.08); *C01B 32/192* (2017.08); *C01B 32/194* (2017.08); *C09K 11/65* (2013.01); *B82Y 20/00* (2013.01); *B82Y 40/00* (2013.01); *Y10S 977/774* (2013.01); *Y10S 977/882* (2013.01)

(58) Field of Classification Search
CPC . C01B 31/0484; C01B 31/0446; C09K 11/65; Y10S 977/882; Y10S 977/774
See application file for complete search history.

(56) References Cited

U.S. PATENT DOCUMENTS

| | | |
|---|---|---|
| 2005/0123467 A1 | 6/2005 | Harutyunyan |
| 2005/0156504 A1 | 7/2005 | Takai et al. |
| 2010/0028559 A1 | 2/2010 | Yan et al. |
| 2010/0028681 A1 | 2/2010 | Dai et al. |
| 2012/0321542 A1 | 12/2012 | Ramaprabhu et al. |

FOREIGN PATENT DOCUMENTS

| | | |
|---|---|---|
| CN | 102602924 A | 7/2012 |
| CN | 102616774 A | 8/2012 |

OTHER PUBLICATIONS

Eswaraiah, et al., Top down method for synthesis of highly conducting graphene by exfoliation of graphite oxide using focused solar radiation, J. Mater. Chem. 2011; 21: 6800.*
Mei, et al., Ultrasonication-assisted ultrafast reduction of graphene oxide by zinc powder at room temperature, Carbon 2011; 49: 5389-5397.*
Peng J., et al., "Graphene Quantum Dots Derived from Carbon Fibers," Nano Letters, vol. 12, Issue 2, pp. 844-849 (2012).
Qian L., et al., "Electroluminescence from light-emitting polymer/ ZnO nanoparticle heterojunctions at sub-bandgap voltages," Nano Today, vol. 5, Issue 5, pp. 384-389 (Jan. 2010).
Rakhi R.B., et al., "Electron field emitters based on multiwalled carbon nanotubes decorated with nanoscale metal clusters," Journal of Nanoparticle Research, vol. 10, Issue 1, pp. 179-189 (May 15, 2007).
Reich S. and Thomsen C., "Raman spectroscopy of graphite," Phil. Trans. R. Soc. Lond. A, vol. 362, Issue 1824, pp. 2271-2288 (Nov. 15, 2004).
Schedin F., et al., "Detection of individual gas molecules adsorbed on graphene," Nature Materials, vol. 6, Issue 9, pp. 652-655 (Sep. 2007).
Schniepp H.C., et al., "Functionalized Single Graphene Sheets Derived from Splitting Graphine Oxide," Journal of Physical Chemistry B, vol. 110, Issue 17, pp. 8535-8539 (2006).
Shang D., et al., "Magnetic and filed emission properties of strawlike CuO nanostructures," Applied Surface Science, vol. 255, Issue 7, pp. 4093-4096 (Jan. 15, 2009).
Shen J., et al., "Facile preparation and upconversion luminescence of graphene quantum dots," Chemical Communications, vol. 47, Issue 9, pp. 2580-2582 (2011).
Shen J., et al., "Graphene quantum dots: emergent nanolights for bioimaging, sensors, catalysis and photovoltaic devices," Chemical Communications, vol. 48, Issue 31, pp. 3686-3699 (2012).

Si Y. and Samulski E.T., "Exfoliated Graphene Separated by Platinum Nanoparticles," Chemistry of Materials, vol. 20, Issue 21, pp. 6792-6797 (Oct. 15, 2008).
Singh TH.J. and Bhatt S.V., "Morphology and conductivity studies of a new solid polymer electrolyte: (PEG) xLiClO4," Bulletin of Materials Science, vol. 26, Issue 7, pp. 707-714 (Dec. 2003).
Soin N., et al., "Enhanced and Stable Field Emission From In Situ Nitrogen-Doped Few Layered Graphene Nanoflakes," Journal of Physical Chemistry C, vol. 115, Issue 13, pp. 5366-5372 (Mar. 11, 2011).
Stankovich S., et al., "Graphene-based composite materials," Nature, vol. 442, Issue 7100, pp. 282-286 (Aug. 2006).
Stoller M.D., et al., "Graphene-Based Ultracapacitors," Nano Letters, vol. 8, Issue 10, pp. 3498-3502 (Sep. 13, 2008).
Sun X., et al., "Nano-Graphene Oxide for Cellular Imaging and Drug Delivery," Nano Res., vol. 1, No. 3, pp. 203-212 (2008).
Sun Y-P., et al., "Quantum-Sized Carbon Dots for Bright and Colorful Photoluminescence," Journal of the American Chemical Society, vol. 128, Issue 24, pp. 7756-7757 (Jun. 21, 2006).
Titelman G.I., et al., "Characteristics and microstructure of aqueous colloidal dispersions of graphite oxide," Carbon, vol. 43, No. 3, pp. 641-649 (2005).
Tuinstra F. and Koenig J.L., "Raman Spectrum of Graphite," The Journal of Chem. Phys., vol. 53, No. 3, pp. 1126-1130 (1970).
Tung V.C., et al., "High-throughput solution processing of large-scale grapheme," Nature Nanotechnology, vol. 4, pp. 25-29 (Jan. 2009).
Viculis L.M., et al., "Intercalation and exfoliation routes to graphite nanoplatelets," Journal of Mater. Chem., vol. 15, pp. 974-978 (2005).
Wang G., et al., "Facile Synthesis and Characterization of Graphene Nanosheets," The Journal of Phys. Chem., vol. 112, No. 22, pp. 8192-8195 (2008).
Wang G., et al., "Synthesis of enhanced hydrophilic and hydrophobic graphene oxide nanosheets by a solvothermal method," Carbon, vol. 47, No. 1, pp. 68-72 (2009).
Wang J., et al., "Cu2ZnSnS4 nanocrystals and graphene quantum dots for photovoltaics," Nanoscale, vol. 3, Issue 8, pp. 3040-3048 (2011).
Wang J.J., et al., "Free-standing subnanometer graphite sheets," Applied Physics Letters, vol. 85, pp. 1265-1267 (2004).
Wang X., et al., "Room-temperature all-semiconducting sub-10-nm graphene nanoribbon field-effect transistors," Physical Review Letters, vol. 100, Issue 20, pp. 206803-1-206803-4 (May 23, 2008).
Williams G. and Kamat V.P., "Graphene-Semiconductor Nanocomposites: Excited-State Interactions between ZnO Nanoparticles and Graphene Oxide," Langmuir, vol. 25, Issue 24, pp. 13869-13873 (2009).
Wu Z-S., et al. "Synthesis of high-quality graphene with a predetermined number of layers," Carbon, vol. 47, pp. 493-499 (2009).
Yamaguchi H., et al., "Field Emission From Atomically Thin Edges of Reduced Graphene Oxide," ACS Nano, vol. 5, No. 6, pp. 4945-4952 (May 27, 2011).
Yoo E., et al., Enhanced Electrocatalytic Activity of Pt Subnanoclusters on Graphene Nanosheet Surface, Nano Lett., vol. 9, No. 6, pp. 2255-2259 (Jun. 2009).
Yoo E., et al. "Large Reversible Li Storage of Graphene Nanosheet Families for Use in Rechargeable Lithium Ion Batteries," Nano Letters vol. 8, No. 8, pp. 2277-2282 (Aug. 2008).
Yu K., et al., "Significant improvement of field emission by depositing zinc oxide nanostructures on screen-printed carbon nanotube films," Applied Physics Letter, vol. 88, Issue 15, pp. 153123-1-153123-3 (2006).
Zhang S., et al., "Field-emission mechanism of island-shaped graphene-BN Nanocomposite," The Journal of Physical Chemistry C, vol. 115, Issue 19, pp. 9471-9476 (2011).
Zhang S., et al., "First-principles study of field emission properties of graphene-ZnO Nanocomposite," Journal of Physical Chemistry C, vol. 114, No. 45, pp. 19284-19288 (2010).
Zheng W. T., et al., "Field Emission From a Composite of Graphene Sheets and Zno Nanowires," Journal of Physical Chemistry C, vol. 113, No. 21, pp. 9164-9168 (2009).

(56) References Cited

OTHER PUBLICATIONS

Zhu S., et al., "Strongly green-photoluminescent graphene quantum dots for bioimaging applications," Chemical Communications, vol. 47, Issue 24, pp. 6858-6860 (2011).

Zhu Y.W., et al., "Large-scale synthesis and field emission properties of vertically oriented CuO nanowire films," Nanotechnology, vol. 16, Issue 1, pp. 88-92 (2005).

Zickler G.A., et al., "A reconsideration of the relationship between the crystallite size La of carbons determined by X-Ray diffraction and Raman spectroscopy," Carbon, vol. 44, Issue 15, pp. 3239-3246 (Dec. 2006).

International Search Report and Written Opinion for International Application No. PCT/IB2014/063909 dated Apr. 14, 2015.

"Composition of PLATINUM," National Institute for Standards and Technology, Retrieved from the Internet URL: http://physics.nist.org/cgi-bin/Star/compos.pl?matno=078, retrieved on Feb. 12, 2016, pp. 1-1.

Allen M.J., et al., "Honeycomb Carbon: A Review of Graphene," Chemical Reviews, vol. 110, Issue 1, pp. 132-145 (2010).

Baby T.T. and Ramaprabhu S., "Cold field emission from hydrogen exfoliated graphene composites," Applied Physics Letters, © 2011 American Institute of Physics, vol. 98, Issue 18, pp. 183111-1-183111-3 (May 2011).

Baby, T.T. and Ramaprabhu S., "Effect of metal nanoparticles decoration on electron field emission property of graphene sheets," Nanoscale, vol. 3, Issue 10, pp. 4170-4173 (Aug. 25, 2011).

Balandin A.A., et al., "Superior Thermal Conductivity of Single-Layer Graphene," Nano Letters, vol. 8, No. 3, pp. 902-907 (2008).

Chae H.K., et al. "A route to high surface area, porosity and inclusion of large molecules in crystals," Nature vol. 427, pp. 523-527 (Feb. 5, 2004).

Chen G. et al., "Atomic decoration for improving the efficiency of field electron emission of carbon nanotubes," Journal of Physical Chemistry C, vol. 111, Issue 13, pp. 4939-4945 (Mar. 9, 2007).

Cheng H., et al., "Graphene-Quantum-Dot Assembled Nanotubes: A New Platform for Efficient Raman Enhancement," ACS Nano, vol. 6, No. 3, pp. 2237-2244 (2012).

Chung D.D.L., "Review Graphite," Journal of Materials Science, vol. 37, Issue 8, pp. 1475-1489, (2002).

Dervishi E. et al. "Supplementary Information—Large-Scale Graphene Production by RF-cCVD Method," Supplementary Material (ESI) for Chemical Communications, This journal is (c) of the Royal Society of Chemistry, pp. 1-5 (2009).

Dervishi E., et al., "Large-scale graphene production by RF-cCVD method," Chemical Communications, This journal is (c) of The Royal Society of Chemistry, pp. 4061-4063, (May 27, 2009).

Forsman W.C., et al., "Chemistry of graphite intercalation by nitric acid," Carbon, vol. 16, Issue 4, pp. 269-271 (1978).

Gao W., et al., "New Insights into the structure and reduction of graphite oxide," Nature Chemistry, vol. 1, Issue 5, © 2009 Macmillan Publishers Limited, pp. 1-6, (Jul. 5, 2009).

Gao W., et al., "Supplementary Information—New Insights into the structure and reduction of graphite oxide," Nature Chemistry, vol. 1, Issue 5, © 2009 Macmillan Publishers Limited, pp. 1-20 (2009).

Geim A.K. and Novoselov K.S., "The rise of graphene," Nature Materials, © Nature Publishing Group, vol. 6, pp. 183-191 (2007).

Gokus T. et al., "Making Graphene Luminescent by Oxygen Plasma Treatment," ACS Nano, Copyright © 2009 American Chemical Society, vol. 3, Issue 12, pp. 3963-3968 (Nov. 19, 2009).

Gómez-Navarro C. et al., "Electronic Transport Properties of Individual Chemically Reduced Graphene Oxide Sheets," Nano letter, Copyright © 2007 American Chemical, vol. 7, Issue 11, pp. 3499-3503 (Oct. 18, 2007).

Goswami S. et al., "Preparation of graphene-polyaniline composites by simple chemical procedure and its improved field emission properties," Carbon, vol. 49, Issue 7, pp. 2245-2252, (Jan. 31, 2011).

Green A.A. and Hersam M.C., "Solution Phase Production of Graphene with Controlled Thickness via Density Differentiation," Nano Letters, vol. 9, Issue 12, pp. 4031-4036 (Dec. 2009).

Huang W., et al., "Solubilization of Single-Walled Carbon Nanotubes with Diamine-Terminated Oligomeric Poly (ethylene Glycol) in Different Functionalization Reactions," Nano Letters, vol. 3, Issue 4, pp. 565-568 (2003).

Hummers, Jr., W.S. and Offerman R.E., "Preparation of Graphitic Oxide," Journal of the American Chemical Society, vol. 80, Issue 6, pp. 1339-1339 (Mar. 20, 1958).

Hwang J.O. et al., "Vertical ZnO nanowires/graphene hybrids for transparent and flexible field emission," Journal of Materials Chemistry, vol. 21, Issue 10, pp. 3432-3437 (Aug. 2, 2011).

Hwang J.O. et al., "Workfunction-Tunable, N-Doped Reduced Graphene Transparent Electrodes for High-Performance Polymer Light-Emitting Diodes," ACS Nano, Copyright © 2011 American Chemical Society, vol. 6, Issue 1, pp. 159-167 (Dec. 13, 2011).

Jang H-S. et al., "Enhancement of field emission of SnO2 nanowires film by exposure of hydrogen gas," Solid State Communications, vol. 140, Issues 11-12, pp. 495-499 (Dec. 2006).

Jeong H-K. et al. "Unoccupied electronic states in graphite oxides," Chemical Physics Letters, vol. 460, Issues 4-6, pp. 499-502 (Jul. 2008).

Jeong S-H., et al., "Template-based carbon nanotubes and their application to a field emitter," Applied Physics Letter, vol. 78, Issue 14, pp. 2052-2054 (Apr. 2001).

Kaniyankandy S., et al., "Ultrafast Charge Transfer Dynamics in Photoexcited CdTe Quantum Dot Decorated on Graphene," Journal of Physical Chemistry C, vol. 116, No. 30, pp. 16271-16275 (2012).

Kaniyoor A., et al., "Supplementary Information—Graphene synthesis via hydrogen induced low temperature exfoliation of graphite oxide," Journal of Materials Chemistry, Supplementary Material (ESI) for Journal of Materials Chemistry, This Journal is (c) the Roral Society of Chemistry, Issue 9, vol. 20, pp. 1-9 (2010).

Kaniyoor A., et al., "Graphene synthesis via hydrogen induced low temperature exfoliation of graphitic oxide," Journal of Materials Chemistry, vol. 20, pp. 8467-8469 (Sep. 7, 2010).

Knibbe R., et al., "Ultrahigh Electron Emissive Carbon Nanotubes with Nano-sized RuO2 Particles Deposition," Journal of Nanoparticle Research, vol. 9, Issue 6, pp. 1201-1204 (Dec. 2007).

Kong B-S., et al., "Electrical Conductivity of Graphene Films with a Poly(allylamine hydrochloride) Supporting Layer," Langmuir, vol. 25, No. 18, pp. 11008-11013 (Aug. 6, 2009).

Kudin K.N., et al., "Raman Spectra of Graphite Oxide and Functionalized Graphene Sheets," Nano Letters, vol. 8, No. 1, pp. 36-41. (2008).

Lee S.W., et al., "A Study on Field Emission Characteristics of Planar Graphene Layers Obtained from a Highly Oriented Pyrolyzed Graphite Block," Nanoscale Research Letters, vol. 4, No. 10, pp. 1218-1221 (2009).

Li X., et al., "Chemically derived, ultrasmooth graphene nanoribbon semiconductors," Science, vol. 319, Issue 5867, pp. 1229-1232 (Feb. 29, 2008).

Li Y., et al., "Nitrogen-Doped Graphene Quantum Dots with Oxygen-Rich Functional Groups," Journal of the American Chemical Society, vol. 134, No. 1, pp. 15-18 (2012).

Lin Y-H., et al., "Atomic Layer Deposition of Zinc Oxide on Multiwalled Carbon Nanotubes for UV Photodetector Applications," Journal of the Electrochemical Society, vol. 158, Issue 2, pp. K24-K27 (2011).

Liu J. et al., "Improved field emission property of graphene paper by plasma treatment," Applied Physics Letters, vol. 97, No. 3, pp. 033109-1-033109-3 (2010).

Liu J., et al., "Reduction of functionalized graphite oxides by trioctylphosphine in non-polar organic solvents," Carbon, vol. 48, Issue 8, pp. 2282-2289 (Jul. 2010).

Liu J., et al., "Ultrathin Seed-Layer for Tuning Density of ZnO Nanowire Arrays and Their Field Emission Characteristics," Journal of Physical Chemistry C, vol. 112, No. 31, pp. 11685-11690 (Jul. 10, 2008).

Lu Z., et al., "The Field Emission Properties of Graphene Aggregates Films Deposited on Fe—Cr—Ni Alloy Substrates," Journal of Nanomaterials, vol. 2010, pp. 1-4 (2010).

LV W., et al. "Low-Temperature Exfoliated Graphenes: Vacuum-Promoted Exfoliation and Electrochemical Energy Storage," ACS Nano, vol. 3, Issue 11, pp. 3730-3736 (Oct. 2009).

(56) References Cited

OTHER PUBLICATIONS

Ma W-L., and Li S-S., "Electrically controllable energy gaps in graphene quantum dots," Applied Physics Letters, vol. 100, Issue 16, pp. 163109-1-163109-4 (Apr. 2012).

Maiti A., et al., "Effect of adsorbates on field emission from carbon nanotubes," Physical Review Letters, vol. 87, Issue 15, pp. 1-4 (Oct. 8, 2001).

Meng L.Y and Park S. J., "Synthesis of Graphene Nanosheets via Thermal Exfoliation of Pretreated Graphite at Low Temperature," Advanced Materials Research, vol. 123-125, pp. 787-790 (Aug. 2010).

Murakami H., et al., "Field Emission from Well-aligned, Patterned, Carbon Nanotube Emitters," Applied Physics Letter, vol. 76, Issue 13, pp. 1776-1778 (Mar. 2000).

Novoselov K.S., et al., "Electric Field Effect in Atomically Thin Carbon Films," Science, vol. 306, Issue 5696, pp. 666-669 (Oct. 22, 2004).

Novoselov K.S., et al., "Two-dimensional gas of massless Dirac fermions in graphene," Nature, vol. 438, pp. 197-200 (Nov. 10, 2005).

Pan D., et al., "Hydrothermal Route for Cutting Graphene Sheets into Blue-Luminescent Graphene Quantum Dots," Advanced Materials, vol. 22, Issue 6, pp. 734-738 (Feb. 9, 2010).

Baby, T.T., "Carbon Nanocomposites: Synthesis and Applications in Electron Field Emission, Nanofluid and Biosensor," A Thesis to be submitted for Award of the degree of Doctor of Philosophy, Department of Physics, Indian Institute of Technology, Madras, pp. 1-17 (Mar. 2011).

Chen, C.S. et al.,"Zinc oxide nanoparticle decorated multi-walled carbon nanotubes and their optical properties," Acta Materialia, vol. 54, pp. 5401-5407 (2006).

Cho, S., et al., "Precursor Effects of Citric Acid and Citrates on ZnO Crystal Formation," Langmuir, vol. 25, pp. 3825-3831 (2009).

Parambhath V. B., et al., "Investigation of Spillover Mechanism in Palladium Decorated Hydrogen Exfoliated Functionalized Graphene," Journal of Physical Chemistry C, vol. 115, Issue 31, pp. 15679-15685 (Jul. 2011).

Shen, J., et al., "One-pot hydrothermal synthesis of graphene quantum dots surface-passivated by polyethylene glycol and their photoelectric conversion under near-infrared light," New Journal of Chemistry, vol. 36, Issue 1, pp. 97-101 (2012).

\* cited by examiner

FIGURE 5A, B, C.

GRAPHENE QUANTUM DOTS, THEIR COMPOSITES AND PREPARATION OF THE SAME

CROSS-REFERENCE TO RELATED APPLICATIONS

This Application is a U.S. National Stage filing under 35 U.S.C. § 371 of International Patent Application No. PCT/IB2014/063909, filed on Aug. 14, 2014, and entitled "GRAPHENE QUANTUM DOTS, THEIR COMPOSITES AND PREPARATION OF THE SAME", which in turn claims priority to Indian Patent application No. 3641/CHE/2013, filed on Aug. 16, 2013, and entitled "GRAPHENE QUANTUM DOTS, THEIR COMPOSITES AND PREPARATION OF THE SAME", the contents of which are hereby incorporated by reference in their entirety.

FIELD

The present invention relates to compositions and methods for the synthesis of graphene quantum dots and hybrid composites.

BACKGROUND

Carbon, the sixth element of the Periodic Table, exists in various allotropic forms that span multiple dimensions, for example, 0D fullerenes, 1D nanotubes and 2D graphene. Each of these nano-allotropes has diverse properties and hence, varied applications. Graphene is a single-atom thick sheet of carbon atoms and that possesses desirable properties, such as, for example, high conductivity, high mechanical strength, high thermal conductivity, etc. Charge carrier concentration and mobility in graphene sheets are as high as $10^{13}$ cm$^{-2}$ and 10,000 cm$^2$ V$^{-1}$s$^{-1}$ at room temperature. Moreover, single layer graphene has a Young's modulus of ~1 TPa, close to value of bulk graphite. Several synthesis procedures exist for large scale production of single and few layer graphene sheets. While the discovery of 2-D graphene by Novoselov and Geim lead to the 2010 physics Nobel prize, the zero band gap of 2-D graphene limits its electronic application, which is primarily based on semiconductors. The zero band gap of graphene can be overcome by modifying its size and shape, for example, reduction of the lateral size of the graphene sheets to small length scales (for example, a few nm), a band gap opens up making the material semiconducting.

Graphene nanoribbons address this drawback of single layer graphene, however, more recently, focus has been on another carbon nanostructure called graphene quantum dots (GQDs) or carbon quantum dots (CQD) (also known as graphene quantum discs). GQDs show very desirable photoluminescence properties, as the size and shape of the GQDs can be tuned to have desired band gap and emission properties. Moreover, GQDs have desirable characteristics, for example, high surface area, larger diameter, better surface grafting using the π-π conjugated network or surface groups and other special physical properties due to the structure of graphene. Since most of the carbon nanomaterials including GQDs are biocompatible and nontoxic, GQDs can advantageously be used in biological applications for example, image scanning and sensing, drug delivery and cancer treatment. The photoluminescence properties of GQDs are useful for photovoltaic applications too as it has been theoretically proved that the energy gap in GQDs can be tuned by using electrostatic potentials.

The band gap of a GQD depends on its size and shape. With existing technology it is possible to cut graphene in to desirable size and shape forms. As the number of atoms increases, the energy gap in almost all the energy spectra of GQDs decreases monotonously. In the case of GQDs, along with size and shape, the edge type plays an important role in electronic, magnetic and optical properties.

Typical synthesis procedures of GQDs include laser ablation treatment, solvothermal methods, hydrazine methods, hydrothermal methods, micro wave synthesis, chemical treatment of carbon fiber and bottom up methods. Depending on the synthesis procedure some GQDs are water soluble and some are not. Since the edges are highly active, functional groups may become attached, which may alter the solubility of the GQDs. The yield of production of GQDs in each of these typical procedures is less than 20%. In most of the cases a mixture of GQD and 1-D nanostructures and/or GQD and 2-D nanostructures is obtained.

SUMMARY

Some embodiments disclosed herein comprise methods of generating compositions comprising zero dimensional graphene quantum dots (0-D GQDs), alone or in combination with one dimensional carbon nanotubes, for example, graphene quantum dot embedded graphenated carbon nanotubes (GQD-G-CNT) or two-dimensional graphene sheets such as GQD-Gs (graphene quantum dot embedded graphene sheets). The quantum dots, in several embodiments, are of a regular size of about 2.2 nm, and absorb ultraviolet light and emit blue light.

In several embodiments, methods are provided for making a composite of zero dimensional graphene quantum dots (0-D GQD) comprising placing graphite oxide (GO) in a furnace, flushing the furnace with an inert gas, followed by introducing hydrogen (e.g., hydrogen gas) into the furnace and heating the GO at about 200° C. in the presence of hydrogen (H$_2$); and then cooling the furnace to room temperature.

In several embodiments, there are methods provided for making a composite of zero dimensional graphene quantum dots. In one case, the method comprises providing dried graphite oxide (GO) and treating the GO with focused solar radiation.

There are also provided herein methods for making zero dimensional graphene quantum dots (0-D GQDs), comprising drying graphite oxide (GO) and heating the dried graphite oxide (GO) to about 200° C. under reduced pressure conditions.

Additionally provided are methods of making composites of zero dimensional graphene quantum dots (0-D GQD) and one dimensional carbon nanotubes (1-D CNT), the methods comprising placing a mixture of graphite oxide (GO) and MnNi$_3$ in a furnace, flushing the furnace with an inert gas, introducing hydrogen (H$_2$) into the furnace, heating that mixture to about 200° C. in the presence of hydrogen for about 5 minutes, then heating that mixture to about 700° C., introducing acetylene to the furnace; and finally cooling the furnace to room temperature.

Based on the methods herein, there is also provided a composition comprising 0-D graphene quantum dots, wherein the 0-D graphene quantum dots have an average size of about 2.2+/−1 nm, and wherein the 0-D graphene quantum dots absorb UV-light and emit blue light.

DETAILED DESCRIPTION

Figure 1:
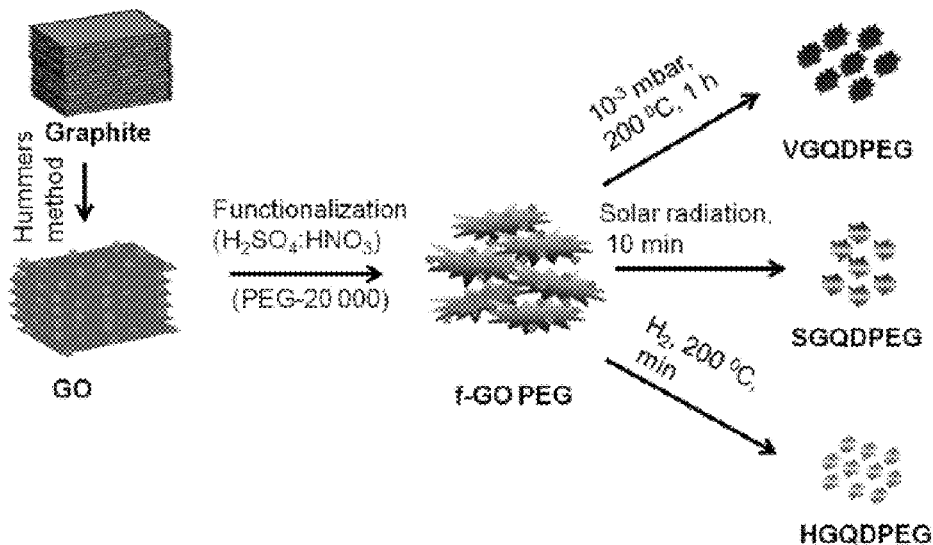
FIG. 1 shows a schematic of different synthesis procedures of graphene quantum dots (GQDs).

The low quantum yield and reduced solubility of GQDs in water are the main difficulties in commercialization of GQDs. Simpler and more efficient methods are necessary to synthesize graphene quantum dots (GQDs) and their hybrid composites in large quantities. Several embodiments of the methods disclosed herein address the shortcomings of current GQD production methods.

Graphene quantum dots (GQDs) prepared by the methods disclosed herein are substantially uniform in size (for example, about 2.2 nm). The average particle size (for example, about 2.2 nm) is less than any of the existing synthesis procedures. The proposed synthesis procedures are easy to handle and fast. Using the cost-effective synthesis procedures disclosed herein, large quantities of water soluble GQDs can be produced. Hybrid composites with two-dimensional graphene and one-dimensional multi-walled nanotubes (MWNT) can be synthesized in-situ methods so that 0 D, (0 D+2 D) and (0 D+1 D+2 D) carbon based nanocomposites can be synthesized. In addition, the graphene quantum dots show a strong blue emission, on exposure to UV light, indicating that these can be used as "blue phosphors".

Some embodiments disclosed herein comprise methods of making zero dimensional graphene Quantum Dots (0-D GQDs). In some aspects these embodiments comprise one or more of the steps of providing a composition comprising graphite oxide (GO); placing the GO in a furnace; flushing the furnace with an inert gas (for example, for a first time period at a first temperature); introducing hydrogen into the furnace (for example, for a second time period at a second temperature); heating the GO at about 200° C. in the presence of hydrogen gas; and cooling the furnace to room temperature. In several embodiments, exfoliation of 0-D GQDs occurs upon heating of GO to 200° C., thereby generating a composition comprising 0-D GQDs. In some aspects the GO is heated to a temperature at or greater than the decomposition temperature of GO/f-GO. In some embodiments the temperature is about 190, about 200, about 205, about 210, about 215, about 220, about 225, about 230, about 240, about 250, about 260, about 270, about 280, about 290, about 300, about 400, about 500, about 600, about 700, about 800, about 900, or about 1000° C. (or ranges between any two of these values). In some aspects the inert gas is argon gas. In some aspects the furnace is flushed with the inert gas for a first time period, said first time period is, depending on the embodiment, about 13, about 13.5, about 14.0, about 14.5, about 15.0, about 15.5, about 16.0, or about 16.5 minutes (or ranges between any two of these values). In some aspects the first time period is 15 minutes. In some aspects the first time period is a time period sufficient to flush all non-inert gas from the furnace. In some aspects the temperature at which the furnace is flushed with the inert gas (for example, the first temperature) is about 20° C. to about 30° C. In some aspects the first temperature is about 18, about 19, about 20, about 21, about 22, about 23, about 24, about 25, about 26, about 27, about 28, about 29, about 30, about 31, about 32, or about 33° C. In some aspects, the hydrogen gas is introduced into the furnace for a second time period and at a second temperature. In several embodiments, the second time period is about 5 minutes. For example, in several embodiments, the second time period is about 4 minutes, about 4.25, about 4.5, about 4.75, about 5.0, about 5.25, about 5.5, or about 5.75 minutes. In some aspects the second time period is 5 minutes. In some aspects the second time period is a time period sufficient to replace substantially all of the inert gas with hydrogen gas. In some aspects the second time period is a time period sufficient to replace at least about 90, about 91, about 92, about 93, about 94, about 95, about 96, about 97, about 98, about 99, or more than 99% of the inert as with hydrogen gas ($H_2$), in some aspects the second temperature is below the decomposition temperature of GO/f-GO. In some aspects the second temperature is about 20° C. to about 30° C. In some aspects the second temperature is about 18, about 19, about 20, about 21, about 22, about 23, about 24, about 25, about 26, about 27, about 28, about 29, about 30, about 31, about 32, or about 33° C. In some aspects the manufactured composition further comprises two-dimensional graphene sheets, such as GQD-Gs (graphene quantum dots embedded in graphene sheets).

In some aspects the method further comprises dispersing the 0-D GQDs in water. In some aspects the method further comprises dialyzing to separate pure (or substantially pure) 0-D GQDs from unreacted GO (or other side and/or byproducts). In some aspects the heating to a decomposition temperature for example, about 190, about 195, about 200, about 205, about 210, about 215, about 220, about 225, about 230, about 240, about 250, about 260, about 270, about 280, about 290, about 300, about 400, about 500, about 600, about 700, about 800, about 900, or about 1000° C. (and ranges between any two of these values) is maintained for at least 30 minutes (for example, about 30 minutes to about 45 minutes, about 45 minutes to about 1 hour, about 1 to about 2 hours, or greater periods of time, depending on the embodiment). In some aspects, the graphite oxide is functionalized graphite oxide (f-GO). In some aspects the graphite oxide is surface passivated functionalized graphite oxide (f-GO PEG). In several embodiments, the f-GO PEG are manufactured under sonication conditions (for example, such as ultrasonication).

In some aspects the 0-D GQDs are water soluble, in some aspects the 0-D GQDs emit blue light upon exposure to UV light. In some aspects the 0-D GQDs are biocompatible. In some aspects the 0-D GQDs are biocompatible. In some aspects the provided graphite oxide has previously been dried in a heated vacuum oven. In some aspects the heated vacuum oven is held at 50° C. In some aspects the heated vacuum oven is held at about 50° C. In some aspects the heated vacuum oven is held at about 45, about 46, about 47, about 48, about 49, about 50, about 51, about 52, about 53, about 54, or about 55° C. (or ranges between any two of these values). In some aspects the heated vacuum oven is held at a temperature below the decomposition temperature. In some aspects the vacuum oven is held at a temperature below about 200° C., including about 199, about 197, about 195, about 193, about 191, about 189, about 187, about 185, about 183, about 181, about 179, about 177, about 175, about 170, or less than about 170° C. (or ranges between any two of these values).

Some embodiments disclosed herein comprise methods of making zero dimensional graphene Quantum Dots (0-D GQDs). In some aspects these methods comprise one or more of the steps of providing a composition comprising graphite oxide (GO); contacting the GO to focused solar radiation; wherein exfoliation of 0-D GQDs occurs upon contacting the GO to focused solar radiation, thereby making 0-D GQDs. In some aspects the solar radiation is passed through a lens. In some aspects the sample is placed at the focal point of the lens (in several embodiments, more than one lens is optionally used, in order to, for example, enhance the production of 0-D GQDs). In some aspects the method further comprises dispersing the composition in water. In some aspects the method further comprises dialyzing the 0-D GQDs to separate them from, for example reaction byproducts or other impurities. In some aspects the GO is placed in a petri dish having a transparent lid prior to contacting with solar radiation. In some aspects the graphite oxide is functionalized graphite oxide (f-GO). In some aspects the graphite oxide is surface passivated functionalized graphite oxide (f-GO PEG), generated, for example, by exposure to ultrasonication. In some aspects the 0-D GQDs are water soluble, in whole or in part. In some aspects the 0-D GQDs emit blue light upon exposure to UV light (e.g., light with a wavelength between about 400 nm and about 10 nm). In some aspects the 0-D GQDs are biocompatible. In some aspects the graphite oxide used to make the 0-D GQDs was previously dried, though non-dried (or partially non-dried) GO can be used in several embodiments. Drying can be accomplished by, for example, use of a heated oven (such as a heated vacuum oven). In some aspects the heated oven is held at 50° C. In some aspects the heated vacuum oven is held at about 50° C. In some aspects the heated oven is held at about 40, about 45, about 46, about 47, about 48, about 49, about 50, about 51, about 52, about 53, about 54, or about 55° C. (or ranges between any two of these values). In some aspects the heated oven is held at a temperature below the decomposition temperature. In some aspects the heated oven is held at a temperature below about 200, about 199, about 198, about 197, about 196, about 195, about 194, about 193, about 192, about 191, about 190, about 189, about 188, about 187, about 186, about 185, about 184, about 183, about 182, about 181, about 180, about 179, about 178, about 177, about 176, about 175, about 174, about 173, about 172, about 171, about 170 or less than about 170° C. (or ranges between any two of these values).

Some embodiments disclosed herein comprise methods of making zero dimensional graphene quantum dots (0-D GQDs). In some aspects these methods comprise one or more of the steps of providing graphite oxide (GO), which is optionally previously dried; and heating the GO to about 200° C. under a vacuum, resulting in exfoliation of 0-D GQDs, thereby generating a composition comprising 0-D GQDs. In some aspects the heating is to about 180, about 185, about 190, about 195, about 200, about 205, about 210, about 215, or about 220° C. (or ranges between any two of these values). In some aspects the heating is to a decomposition temperature e.g., about 190, about 195, about 200, about 205, about 210, about 215, about 220, about 225, about 230, about 240, about 250, about 260, about 270, about 280, about 290, about 300, about 400, about 500, about 600, about 700, about 800, about 900, or about 1000° C. (or ranges between any two of these values).

In some aspects the manufactured composition further comprises two-dimensional graphene sheets such as GQD-Gs (graphene quantum dot embedded graphene sheets). In some aspects the method comprises dispersing the composition in water. In some aspects the method comprises dialyzing the composition to isolate 0-D GQDs. In some aspects the vacuum is about $10^{-3}$ mbar. In some aspects the vacuum is within about 10% (plus or minus) of $10^{-3}$ mbar, in some aspects the vacuum is less than $10^{-3}$ mbar (for example, $10^{-4}$ mbar, $10^{-5}$ mbar or less). In some aspects the GO is held in a container having a covering of glass (or other suitable material). In some aspects the graphite oxide is functionalized graphite oxide (f-GO). In some aspects the graphite oxide is surface passivated functionalized graphite oxide (f-GO PEG). In some aspects the 0-D GQDs are water soluble. In some aspects the 0-D GQDs emit blue light upon exposure to UV light in some aspects the 0-D GQDs are biocompatible.

Some embodiments disclosed herein comprise methods of making zero dimensional graphene quantum dots (0-D GQD) and one dimensional carbon nanotubes, for example, graphene quantum dot embedded graphenated carbon nanotubes (GQD-G-CNT). In some aspects the methods comprise one or more of the steps of providing a mixed composition comprising graphite oxide (GO) of a first mass and $MnNi_3$ of a second mass (optionally, depending on the embodiment, the second mass is approximately half of the first mass); placing the mixture in a furnace; flushing the furnace with an inert gas for a first time period at a first temperature; flushing the furnace with hydrogen gas for a second time period at a second temperature; heating the mixture to about 200° C. in the presence of hydrogen gas for a third time period about 5 minutes; heating the mixture to about 700° C.; introducing a carbon precursor for example, acetylene, methane, ethane or other precursor to the furnace for a fourth time period; and cooling the furnace to about room temperature, wherein exfoliation of 0-D GQDs and GQD-G-CNT occurs upon heating of GO to about 200° C., thereby generating a composition comprising 0-D GQDs.

In some aspects the inert gas is argon gas. In some aspects the first time period is about 15 minutes. In some aspects the first time period is a time period sufficient to flush all non-inert gas from the furnace. In some aspects the first temperature is about 20° C.-30° C. For example, in several embodiments, the first temperature is about 18, about 19, about 20, about 21, about 22, about 23, about 24, about 25, about 26, about 27, about 28, about 29, about 30, about 31, about 32, or about 33° C. In some aspects the second time period is about 5 minutes. In some aspects the second time period is a time period sufficient to replace substantially all of the inert gas with Hydrogen gas. In some aspects the second temperature is about 20° C. to bout 30° C.

In some aspects the third time period is about 5 minutes. In some aspects the second time period is about 4.25, about 4.5, about 4.75, about 5.0, about 5.25, about 5.5, or about 5.75 minutes (or times between any of these values). In some aspects the second time period is 5 minutes.

In some aspects the third incubation temperature is to about 180, about 185, about 190, about 195, about 200, about 205, about 210 about 215, or about 220° C. (or temperatures in between any two of these values). In some aspects the heating is to a decomposition temperature for example, about 190, about 195, about 200, about 205, about 210, about 215, about 220, about 225, about 230, about 240, about 250, about 260, about 270, about 280, about 290, about 300, about 400, about 500, about 600, about 700, about 800, about 900, or about 1000° C. (or temperatures between any of these values). In some aspects the fourth time period is about 20 minutes, for example, 18, 19, 20, 21, or 22 minutes. In some aspects the manufactured composition further comprises two-dimensional graphene sheets such as GQD-Gs (graphene quantum dot embedded graphene sheets). In some aspects the method further comprises dispersing the composition in water and dialyzing the composition to isolate 0-D GQDs. In some aspects the dried graphite oxide (GO) and MnNi$_3$ are ground. In some aspects the dried graphite oxide (GO) and MnNi$_3$ are in the form of discrete particles.

In some aspects the graphite oxide is functionalized graphite oxide (f-GO). In some aspects the graphite oxide is surface passivated functionalized graphite oxide (f-GO PEG). In some aspects the 0-D GQDs are water soluble. In some aspects the 0-D GQDs emit blue light upon exposure to UV light. In some aspects the 0-D GQDs are biocompatible. In some aspects the 0-D GQDs are biocompatible. In some aspects the provided graphite oxide is previously dried in, for example, a heated vacuum oven. In some aspects the heated vacuum oven is held at about 50° C. In some aspects the heated vacuum oven is held at about 45, about 46, about 47, about 48, about 49, about 50, about 51, about 52, about 53, about 54, or about 55° C. In some aspects the heated vacuum oven is held at 50° C.

Some embodiments disclosed herein comprise compositions comprising 0-D GQDs, wherein the 0-D GQDs have an average size of about 2.2+/−1 nm (for example, about 2.1 nm, about 2.2 nm or about 2.3 nm), that absorb UV-light and emit blue light. In some aspects the composition has an absorption peak at an electromagnetic wavelength of about 268 nm (for example, about 249, about 250, about 251, about 252, about 253, about 254, about 255, about 256, about 257, about 258, about 259, about 260, about 261, about 262, about 263, about 264, about 265, about 266, about 267, about 268, about 269, about 270, about 271, about 272, about 273, about 274, about 275, about 276, about 277, about 278, about 279, about 280, about 281, about 282, about 283, about 284, about 285, about 286, about 287, about 288, about 289, about 290, about 292, about 293, about 294, or about 295 nm) a peak emission wavelength of ranging from about 440 to about 450 nm (for example, about 390, about 395, about 400, about 405, about 410, about 415, about 420, about 425, about 430, about 435, about 440, about 445, about 450, about 455, about 460, about 465, about 470, about 475, about 480, about 485, about 490, about 495, or about 500 nm, and overlapping wavelengths there between) and a peak excitation wavelength about 310 nm (for example, about 280, about 285, about 290, about 295, about 300, about 305, about 310, about 315, about 320, about 325, about 330, about 335, or about 340 nm, and overlapping wavelengths there between).

In some aspects the composition further comprises two-dimensional graphene sheets such as GQD-Gs (graphene quantum dot embedded graphene sheets). In some aspects the 0-D GQDs are functionalized graphite oxide (f-GO) 0-D GQDs. In some aspects the 0-D GQDs are surface passivated functionalized graphite oxide (f-GO PEG) 0-D GQDs. In some aspects the 0-D GQDs are water soluble. In some aspects the 0-D GQDs emit blue light upon exposure to UV light. In some aspects the 0-D GQDs are biocompatible.

Some embodiments disclosed herein comprise compositions comprising 0-D GQDs. In some aspects the compositions are characterized such that the 0-D GQDs have an average size of about 2.2+/−1 nm (for example, about 2.1 nm, about 2.2 nm or about 2.3 nm), and wherein the 0-D GQD absorb UV-light and emit blue light, wherein the composition is produced by a process comprising the steps of providing a composition comprising dried graphite oxide (GO); placing the dried GO in a furnace; flushing the furnace with an inert gas for a first time period at a first temperature; flushing the furnace with hydrogen gas for a second time period at a second temperature; heating the GO to about 200° C. (for example, to about 180, about 185, about 190, about 195, about 200, about 205, about 210, about 215, or about 220° C., or ranges between any two of these values) in the presence of hydrogen gas; and cooling the furnace to room temperature, wherein exfoliation of 0-D GQDs occurs upon heating of GO to 200° C., or about 200° C., or, for example, to about 180, about 185, about 190, about 195, about 200, about 205, about 210, about 215, or about 220° C. (or ranges between any two of these values), thereby generating said composition.

Some embodiments disclosed herein comprise compositions comprising 0-D GQDs, wherein the 0-D GQDs have one or more of the traits of (i) an average size of about 2.2+/−1 nm, (ii) an absorption peak at an electromagnetic wavelength of about 268 nm, (iii) a peak emission wavelength of about 440-450 nm and (iv) a peak excitation wavelength about 310 nm, wherein the composition is produced by a process comprising one or more of the steps of providing a composition comprising dried graphite oxide (GO); placing the dried GO in a furnace; flushing the furnace with Argon (or other inert gas) for about 15 minutes at about 20° C. to about 30° C.; flushing the furnace with hydrogen gas for about 5 minutes at about 20° C. to about 30° C.; heating the GO to about 200° C. in the presence of hydrogen gas; and cooling the furnace to about 20° C. to about 30° C. (for example, about 18, about 19, about 20, about 21, about 22, about 23, about 24, about 25, about 26, about 27, about 28, about 29, about 30, about 31, about 32, or about 33° C.), wherein exfoliation of 0-D GQDs occurs upon heating of GO to about 200° C., thereby generating said composition.

In some aspects the flushing of the furnace occurs for a time period of about 5 minutes. In some aspects the time period is about 4.25, 4.5, 4.75, 5.0, 5.25, or 5.5 minutes. In some aspects the time period is 5 minutes.

In some aspects the composition has an absorption peak at an electromagnetic wavelength of about 268 nm for example, about 249, about 250, about 251, about 252, about 253, about 254, about 255, about 256, about 257, about 258, about 259, about 260, about 261, about 262, about 263, about 264, about 265, about 266, about 267, about 268, about 269, about 270, about 271, about 272, about 273, about 274, about 275, about 276, about 277, about 278, about 279 about 280, about 281, about 282, about 282, about 283, about 284, about 285, about 286, about 287, about 288, about 289, about 290, about 292, about 293, about 294, or about 295 nm, and ranges between any two of these values) a peak emission wavelength of about 440-450 nm (for example about 390, about 395, about 400, about 405, about 410, about 415, about 420, about 425, about 430, about 435, about 440, about 445, about 450, about 455, about 460, about 465, about 470, about 475, about 480, about 485, about 490, about 495, or about 500 nm and ranges between any two of these values) and a peak excitation wavelength about 310 nm (for example, about 280, about 285, about 290, about 295, about 300, about 305, about 310, about 315, about 320, about 325, about 330, about 335, or about 340 nm and ranges between any two of these values).

Some embodiments disclosed herein comprise compositions comprising 0-D GQDs, wherein the 0-D GQDs have an average size of about 2.2+/−1 nm (for example, about 2.1 nm, about 2.2 nm or about 2.3 nm), and wherein the 0-D GQD absorb UV-light and emit blue light, wherein the composition is produced by a process comprising at least one of the steps of providing a composition comprising dried graphite oxide (GO); contacting the GO to focused solar radiation; wherein exfoliation of 0-D GQDs occurs upon contacting the GO to focused solar radiation, thereby generating a composition comprising 0-D GQDs.

Some embodiments disclosed herein comprise compositions comprising 0-D GQDs, wherein the 0-D GQDs have an average size of about 2.2+/−1 nm (for example, about 2.1 nm, about 2.2 nm or about 2.3 nm), and wherein the 0-D GQD absorb UV-light and emit blue light, wherein the composition is produced by a process comprising at least one of the steps of providing a composition comprising dried graphite oxide (GO); contacting the GO to focused solar radiation; wherein exfoliation of 0-D GQDs occurs upon contacting the GO to focused solar radiation, thereby generating a composition comprising 0-D GQDs.

Some embodiments disclosed herein comprise compositions comprising 0-D GQDs, wherein the 0-D GQDs have an average size of about 2.2+/−1 nm (for example, about 2.1 nm, about 2.2 nm or about 2.3 nm), and wherein the 0-D GQD absorb UV-light and emit blue light.

Some embodiments disclosed herein comprise compositions comprising 0-D GQDs, wherein the 0-D GQDs have an average size of about 2.2+/−1 nm (e.g., about 2.1 nm, about 2.2 nm or about 2.3 nm), and wherein the 0-D GQD absorb UV-light and emit blue light, wherein the composition is produced by a process comprising the steps of providing a composition comprising dried graphite oxide (GO); and heating the GO to about 200° C. (for example, about 180, about 185, about 190, about 195, about 200, about 205, about 210, about 215, or about 220° C., or temperatures in between any of these values) under a vacuum; wherein exfoliation of 0-D GQDs occurs upon heating of GO to about 200° C. (for example, about 180, about 185, about 190, about 195, about 200, about 205, about 210, about 215, or about 220° C., or temperatures in between any of these values), thereby generating a composition comprising 0-D GQDs.

Some embodiments disclosed herein comprise compositions comprising zero dimensional graphene Quantum Dots (0-D GQD) and one dimensional graphene quantum dot embedded graphenated carbon nanotubes (GQD-G-CNT) wherein the composition is produced by a process comprising at least one of the steps of providing a mixed composition comprising dried graphite oxide (GO) of a first mass and MnNi3 of a second mass, wherein the second mass is half of the first mass; placing the mixture in a furnace; flushing the furnace with an inert gas for a first time period at a first temperature; flushing the furnace with hydrogen gas for a second time period at a second temperature; heating the mixture to about 200° C. (for example, about 180, about 185, about 190, about 195, about 200, about 205, about 210, about 215, or about 220° C., or temperatures in between any of these values in the presence of hydrogen gas for a third time period about 5 minutes; (for example, about 4.5, about 4.6, about 4.7, about 4.8, about 4.9, about 5.0, about 5.1, about 5.2, about 5.3, about 5.4, or about 5.5 minutes, or 5 minutes); heating the mixture to about 700° C. (for example, about 630, about 640, about 650, about 660, about 670, about 680, about 690, about 700, about 710, about 720, about 730, about 740, about 750, about 760, or about 770° C.; or about 700, about 710, about 720, about 730, about 740, about 750, about 760, about 770, about 780, about 790, about 800, about 810, about 820, about 830, about 840, about 850, about 860, about 870, about 880, about 890, about 900, about 910, about 920, about 930, about 940, about 950, about 960, about 970, about 980, about 990, or about 1000° C., or temperatures in between any of these values); introducing acetylene to the furnace for a fourth time period; and cooling the furnace to room temperature, wherein exfoliation of 0-D GQDs and GQD-G-CNTs occurs upon heating of GO to about 200° C., thereby generating a composition comprising 0-D GQDs.

The present disclosure introduces different procedures for the synthesis of zero dimension GQDs based on exfoliation/reduction of surface passivated functionalized graphite oxide (f-GO PEG). The present synthesis procedures include exfoliation/reduction f-GO PEG in presence of hydrogen gas at about 200° C., using focused solar radiation and under vacuum at 250° C. Dialysis treatment has been done to separate out GQDs from graphene sheets such as GQD-Gs (graphene quantum dot embedded graphene sheets). The samples were characterized using various experimental techniques. The high-resolution transmission electron microscopy gives an average particle size of 2.2 nm for dialyzed hydrogen exfoliated GQDs (dia HGQDPEG). The optical properties of the dialyzed GQDs have been explored using absorbance and photoluminescence (PL) spectra. A blue light emission has been observed for dia HGQDPEG. Hybrid composites with two-dimensional graphene and one-dimensional MWNTs were synthesized in-situ methods so that one can have 0 D, 0 D+2 D and 0 D+1 D+2 D nanocomposites.

Synthesis of Functionalized Graphite Oxide and Polyethylene Glycol Composite.

Graphite oxide (GO) has been synthesized by Hummers method (1958). To make GQDs, however, graphite is added to concentrated $H_2SO_4$ (optionally with continuous stirring and cooling in an ice bath). Then, $NaNO_3$ and $KMnO_4$ may be added gradually (either together or successively) to the above mixture. The temperature is allowed to come to room temperature, or can alternatively be heated to expedite reaching room temperature. Water is then added to the above mixture, and heated to near or beyond boiling. The mixture is diluted using warm water. Following this, $H_2O_2$ is added till the solution turned bright yellow. The suspension is tittered and the filter cake is repeatedly washed with warm water. The residue is diluted using water and the resulting suspension is separated, for example by centrifugation. The final product is dried and stored in a desiccator until further use.

This GO may be further functionalized, for example with concentrated $H_2SO_4$ and $HNO_3$ (a ratio of 3:1 can be used, for example). Functionalization of GO (f-GO) is accomplished, in several embodiments, by ultrasonicating GO in an acid medium. The pH of the above solution is held at about 7 by adding a basic solution. The mixture is filtered, washed and dried.

Further, f-GO may be dispersed in water by ultrasonication and polyethylene glycol (PEG) was added under ultrasonication. Here, PEG acts as a surface passivation agent. After stirring, the solution was dried. The final product is named as f-GO PEG.

Exfoliation/Reduction for Graphene Quantum Dots.

In several embodiments, vacuum dried f-GO PEG is deposited (for example, sprinkled) on a quartz boat and kept inside a quartz furnace (for example, a tubular quartz furnace). The furnace is flushed with argon (or other inert gas for about 15 minutes (for example, about 1-5 minutes, about 5-7 minutes, about 7-10 minutes, about 10-12 minutes, about 12-15 minutes, about 15-20 minutes, about 20-30 minutes, and overlapping ranges thereof), followed by $H_2$ for about 5 minutes (or other sufficient time period to substantially or completely remove the argon or other inert gas from the furnace) at approximately room temperature (for example, about 22° C. to about 30° C.). In several embodiments, the temperature is raised to 200° C. in the presence of $H_2$. At 200° C., exfoliation occurs within a few minutes, within a few seconds, or even immediately, however, the flow of hydrogen ($H_2$) can optionally be continued (for example, for an additional time of about 1 minute to about 30 minutes). The furnace is cooled naturally to room temperature (in several embodiments, a cooling source is optionally used to expedite the process). The resultant product is a mixture of 2-D graphene and 0-D GQD and is named as HGQDPEG.

In another embodiment, vacuum dried f-GO PEG is sprinkled on a petri dish and covered with another petri dish (or similar vessel/cover). Focused solar radiation is used to exfoliate and reduce the sample. The process takes about 10 minutes to finish (depending on the intensity of the solar radiation). The final product is referred to as SGQDPEG.

In still additional methods, vacuum dried f-GO PEG is deposited in a small beaker protected with a covering glass. The beaker is heated, in several embodiments, in a vacuum oven ($10^{-3}$ mbar) for about 1 hour (for example, about 30 to about 45 minutes, about 45 to about 50 minutes, about 50 to about 55 minutes, about 55 to about 65 minutes, about 65 to about 75 minutes, and overlapping ranges thereof) at about 200° C. Oven is cooled down to room temperature and the sample is taken out. The final product is named VGQDPEG. FIG. 1 shows the schematic of the synthesis procedure.

In several embodiments, the various GQDs are dispersed in, for example, deionized water and dialyzed for between 1 to 6 days (for example, about 1-2, about 2-3, about 3-4, about 4-5, or about 5-6 days) to separate GQD from graphene. After dialysis the samples are named as "dia HGQDPEG", "dia SGQDPEG" and "dia VGQDPEG", respectively. The dialyzed samples are later used for absorption and photoluminescence studies.

In several embodiments, a composite of 0-D GQDs and 1-D graphene quantum dot embedded graphenated carbon nanotubes (GQD-G-CNT) can be synthesized using catalytic chemical vapor deposition (CVD) technique. f-GO PEG and $MmNi_3$ catalysts are ground and the mixture may be sprinkled on, for example, a quartz boat. The furnace may flushed with an inert gas for example, argon, followed by $H_2$. The temperature is raised to the decomposition temperature of GO/f-GO (about 200° C. or higher) in the presence of $H_2$. After an incubation period, for example about 5 minutes, the furnace temperature is raised to 700° C. to 1000° C. The $H_2$ flow is closed and acetylene is allowed to flow through the tube for another time period, for example about 20 minutes or longer. The furnace is cooled down to room temperature and the sample was taken out.

Composites of 0-D GQDs and 1-D graphene quantum dot embedded graphenated carbon nanotubes (GQD-G-CNT) can also be synthesized, for example, using catalytic chemical vapor deposition (CVD) technique. f-GO PEG and 15 mg $MmNi_3$ catalysts are ground the mixture sprinkled on, for example, a quartz boat. After keeping the quartz boat inside the quartz tube placed in the furnace, the ends of the tube are closed (for example, sealed). The temperature is raised to the decomposition temperature of GO/f-GO (about 200° C. or higher) in the presence of $H_2$. After an incubation period, for example about 5 minutes, the furnace temperature is raised to 700° C. to 1000° C. The flow is ceased and acetylene allowed to flow through the tube for another time period, such as about 20 to about 30 minutes, or longer in several embodiments. The furnace is cooled down to room temperature and the sample was taken out.

Structural Analysis

Structural differences of the composition disclosed herein may be distinguished by their x-ray diffraction (XRD) patterns. For example, the XRD patterns showed in FIG. 2*a* reveal structural differences between GO, f-GO and f-GO PEG. The (002) peak at 11.6° of f-GO shifted to 8.9° in the case of f-GO PEG with an additional peak at 18.1°. The d-spacing of f-GO is 0.77 nm whereas it is 0.96 nm in the case of f-GO PEG. Shift in (002) peak, appearance of 17.9° peak and increase in d-spacing are due to the PEG dispersion on f-GO. The shift in (002) towards low angle region is an indication of the amount of oxidation of the sample. The peak at 17.9° is due to PEG in the sample, FIG. 2*b* shows XRD patterns of different exfoliated GQDs. In the case of HGQDPEG, SGQDPEG and VGQDPEG the (002) shifted to about 23.5°. The broadening of the (002) peak is due to the short range ordering of the GQDs and graphene. Since XRD of the exfoliated samples are performed before dialysis, all the samples contain mixture of GQDs and graphene sheets. The d-spacing of different GQDs is nearly 0.378 nm.

Raman spectroscopy is one of the important tools for the characterization of carbon materials. Normally, $sp^2$ hybridized carbon atoms in the sample show a peak about 1580-1600 $cm^{-1}$ called the characteristic G-band. Another peak about 1340-1350 $cm^{-1}$ is called the D-band is due to the $sp^3$ hybridized carbon atoms, defects, disorder and presence of impurities. During the exfoliation/reduction some functional groups get attached to the edges of GQDs, this later helps for water solubility.

The presence of functional groups may be investigated using FTIR spectroscopy. Generally, epoxy and —OH functional groups are attached above and below the basal planes whereas —COOH groups are bound to the edges of the basal planes. In the case of GQDs the intensity of functional groups are less than that of f-GO and f-GO PEG. This is due to the removal of some functional groups during exfoliation/reduction process. The intensities of C═O and C—O groups are comparable in the case of HGQDPEG, SGQDPEG and VGQDPEG. Even after exfoliation/reduction the —OH functional groups are attached to the edges of GQDs which helps for the solubility of them in water.

During the vigorous acid treatment and the subsequent ultrasonication of GO, the graphene sheets such as GQD-Gs (graphene quantum dot embedded graphene sheets) get ruptured and crumbled. Furthermore, carboxyl functional groups attach to the edges of graphene layers. But during exfoliation/reduction in presence of H2, these functional groups react with $H_2$ and form water molecules. So the pre-functionalization followed by exfoliation/reduction causes the formation of GQDs.

The products of these reactions may be visualized using transmission electron microscopy (TEM).

To explore the optical properties of dia HGQDPEG, absorption and photoluminescence (PL) studies may be carried out.

Characterizations of GQDs and CNTs composite (GQD-PEGCNT) may also be performed as described herein.

EXAMPLE 1

Production of f-GO PEG

Two (2) g of graphite was added to 46 ml of concentrated $H_2SO_4$ under continuous stirring in an ice bath. Then, 1 g $NaNO_3$ and 6 g $KMnO_4$ were added gradually and successively to the above mixture. The ice bath was removed and suspension temperature was allowed to come to room temperature. The temperature suddenly rose to around 98° C. upon addition of 92 ml of water. After 15 minutes, the above mixture was diluted to 280 ml using warm water. Following this, 3% $H_2O_2$ was added till the solution turned bright yellow. The suspension was filtered and the filter cake was repeatedly washed with warm water. The residue was diluted using water and the resulting suspension was centrifuged. The final product was dried under vacuum at 50° C. and stored in vacuum desiccator, until further use.

This GO was further functionalized, for example with concentrated $H_2SO_4$ and $HNO_3$ (3:1). Functionalization of GO (f-GO) was done by ultrasonicating 475 mg of GO in a 20 ml acid medium for nearly 3-4 h. pH of the above solution was made 7 by adding 1M NaOH solution. The mixture was filtered, washed and dried under vacuum.

Further, f-GO was dispersed in water by ultrasonication and about 0.2 gm of polyethylene glycol (PEG) was added under ultrasonication. Here, PEG acts as a surface passivation agent. After 2 h of stirring, the solution was dried in vacuum oven at 50° C. The final product is named as f-GO PEG.

EXAMPLE 2

Production of Dialyzed GQDPEGs

The vacuum dried f-GO PEG was sprinkled on a quartz boat and kept inside a tubular quartz furnace. The furnace was flushed with argon for 15 minutes, followed by $H_2$ for 5 minutes at room temperature (30° C.). The temperature was raised to 200° C. in the presence of H2. At 200° C., exfoliation occurred immediately but the flow of hydrogen ($H_2$) was continued for 30 minutes. The furnace was allowed to cool naturally to room temperature. The resultant product was a mixture of GQD-Gs (graphene quantum dot embedded graphene sheets) and 0-D GQD and was named as HGQDPEG. In the second method, vacuum dried f-GO PEG was sprinkled on a petri dish and covered with another one. Focused solar radiation was used to exfoliate and reduce the sample. The process took approximately 10 minutes to finish. The final product was named SGQDPEG. Similarly in the third method, vacuum dried f-GO PEG was taken in a small beaker protected with a covering glass. The beaker was heated in vacuum oven (10-3 mbar) for nearly 1 h at 200° C. Oven was cooled down to room temperature and the sample was taken out. The final product is named VGQD-PEG. FIG. 1 shows the schematic of the synthesis procedure.

All the three samples were dispersed in DI water and dialyzed for nearly 4 days to separate GQD from graphene. After dialysis the samples are named as dia HGQDPEG, dia SGQDPEG and dia VGQDPEG. The dialyzed samples were later used for absorption and photoluminescence studies.

EXAMPLE 3

Synthesis of 0-D GQDs and Quantum Dot Embedded Graphenated Carbon Nanotubes

Composites of 0-D GQDs and 1-D graphene quantum dot embedded. graphenated carbon nanotubes (GQD-G-CNT) were synthesized using catalytic chemical vapor deposition (CVD) technique. In this simple procedure, about 30 mg of f-GO PEG and 15 mg $MmNi_3$ catalysts were ground for 30 minutes and the mixture was sprinkled on a quartz boat. After keeping the quartz boat inside the quartz tube placed in the furnace, ends of the tube were closed. The furnace was flushed with argon for 15 minutes, followed by $H_2$ for 5 minutes at room temperature (30° C.). The temperature was raised to 200° C. in the presence of $H_2$. After 5 minutes, the furnace temperature was raised to 700° C. The $H_2$ flow was closed and acetylene was allowed to flow through the tube for another 20 minutes. The furnace was cooled down to room temperature and the sample was taken out.

EXAMPLE 4

XRD Patterns of Produced GQDs and Related Products

Figure 2A:
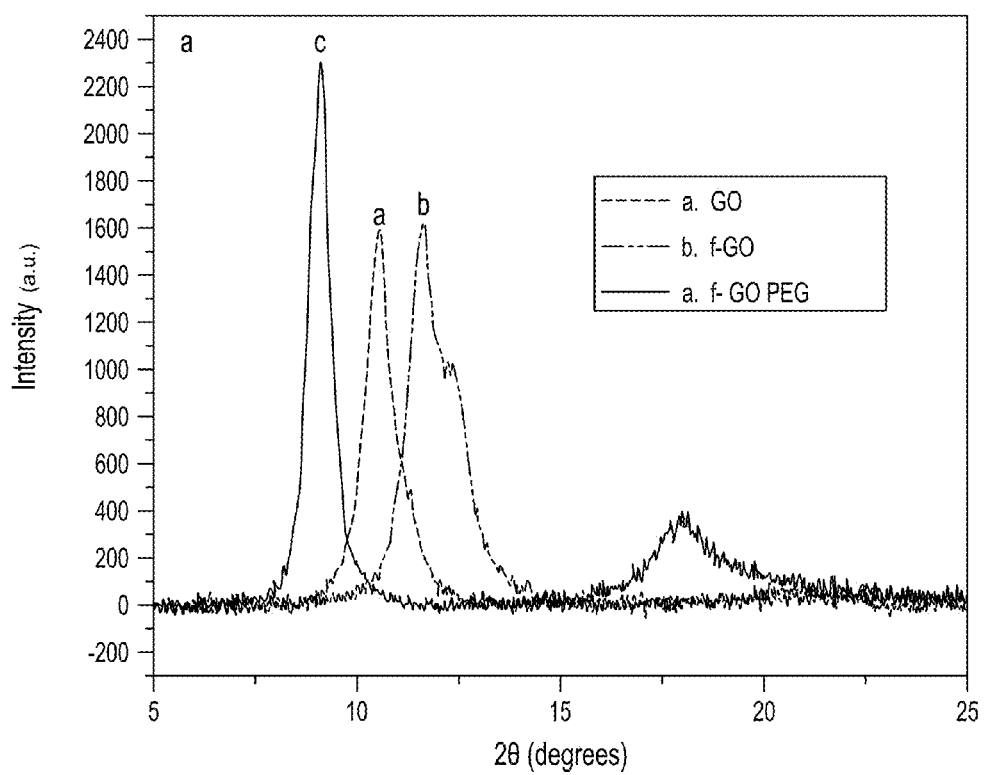
FIG. 2a shows X-ray diffraction patterns of GO, f-GO, f-GO PEG. The Y-axis represents diffracted x-ray intensity (arbitrary units) and the X-axis represents the detector angle (2-theta; degrees).
Figure 2B:
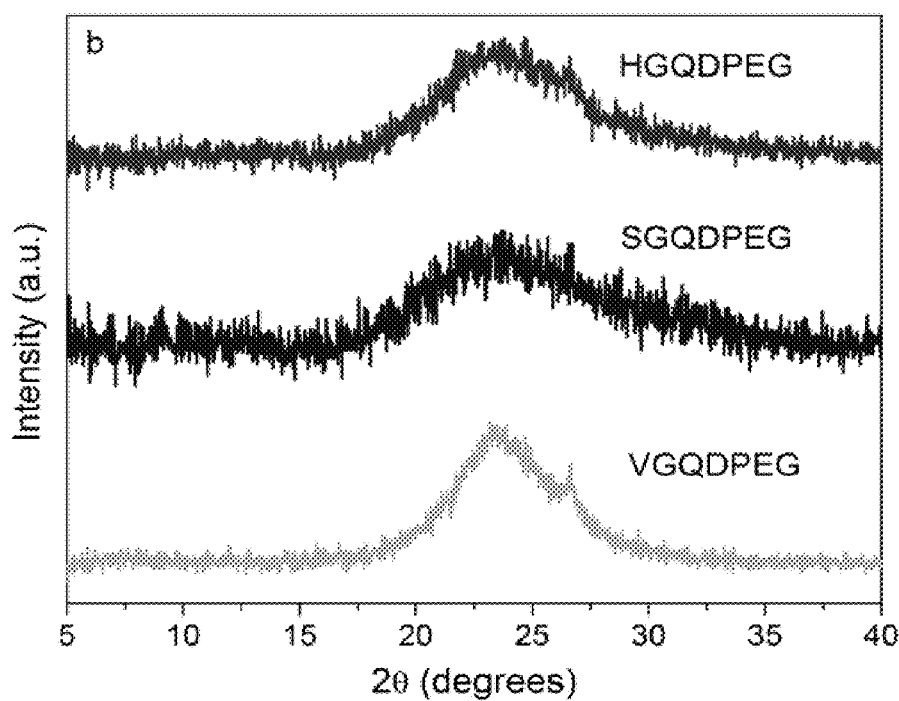
FIG. 2b shows X-ray diffraction patterns of HGQDPEG, SGQDPEG and VGQDPEG. The Y-axis represents diffracted x-ray intensity (arbitrary units) and the X-axis represents the detector angle (2-theta; degrees).

XRD patterns of compositions synthesized in the above-mentioned examples are presented in FIGS. 2a, b.

EXAMPLE 5

Analysis of Raman Spectra of Various GQDs

Figure 3:
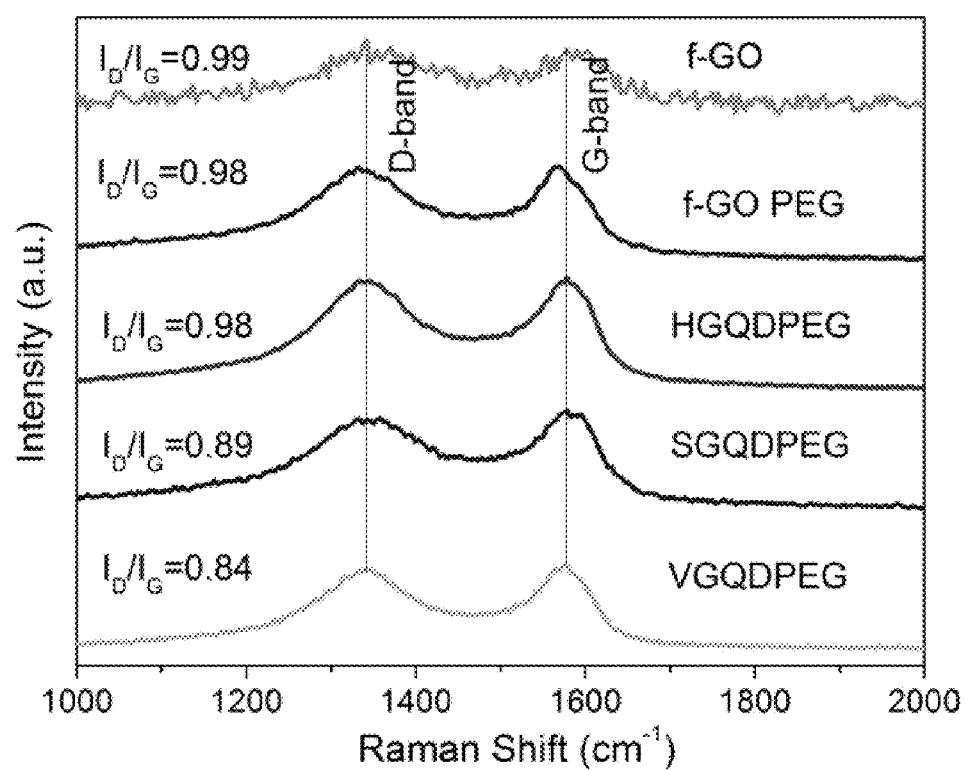
FIG. 3 shows Raman spectra of f-GO, f-GO PEG, HGQDPEG, SGQDPEG and VGQDPEG. The Y-axis represents intensity (arbitrary units) and the X-axis represents the Raman shift ($cm^{-1}$).

Raman spectra of f-GO, f-GO PEG, HGQDPEG, SGQDPEG and VGQDPEG are shown in FIG. 3. The D-band, G-band and intensity ratio of D-band to G-band (ID/IG) of different samples are given in Table 1. The G-band position of f-GO and f-GO PEG has been red shifted compared to that of GO. This shift is due to the presence of more functional groups at the surface, side walls and in between the graphene layers. But in the case of GQDs the G-band has been blue shifted due to the removal of functional groups as well as the exfoliation. The $I_D/I_G$ ratio of HGQDPEG is higher than that of reported values. During the exfoliation/reduction some functional groups get attached to the edges of GQDs, this later helps for water solubility.

EXAMPLE 6

Analysis of FTIR Spectra of Various GQDs

Figure 4:
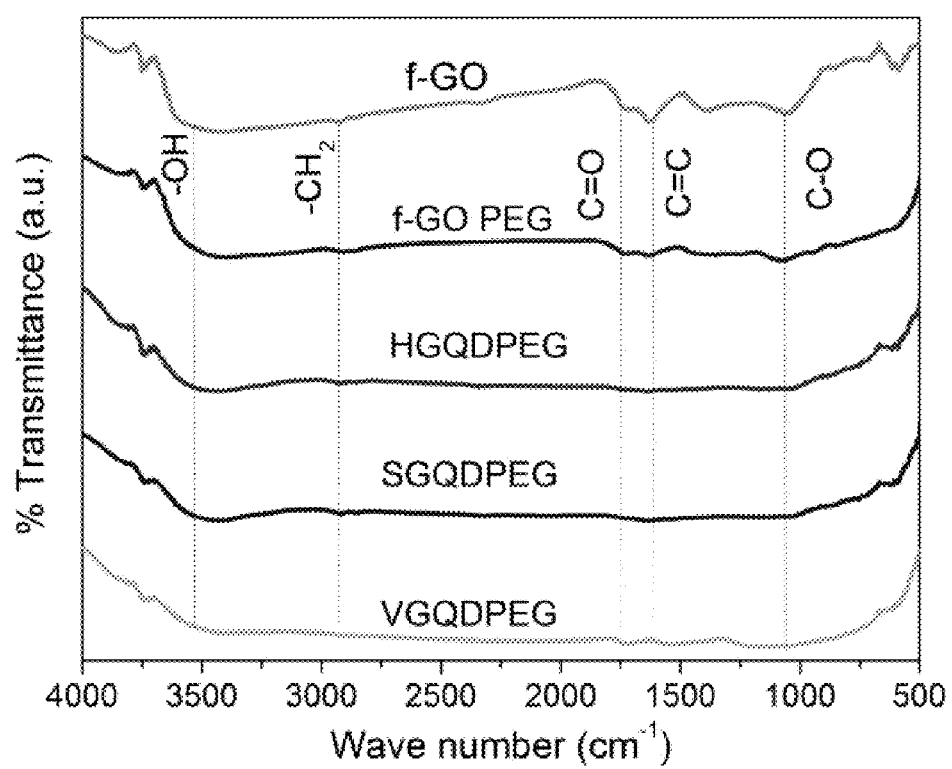
FIG. 4 shows Fourier transform infra-red spectra of f-GO, f-GO PEG, HGQDPEG, SGQDPEG and VGQDPEG. The Y-axis represents diffracted % transmittance (arbitrary units) and the X-axis represents the wave number ($cm^{-1}$).

The FTIR spectra of f-GO, f-GO PEG, HGQDPEG, SGQDPEG and VGQDPEG are shown in FIG. 4. The peak centered about 3525 $cm^{-1}$ corresponds to the —OH vibration of carboxyl group and also due to the adsorbed water molecules, strong C═O peak at 1720 cm$^{-1}$, strong C—O peak at 1230 cm$^{-1}$, weak —OH bending at 1410 cm$^{-1}$. The broadening of the —OH peak is due to hydrogen bonding between the OH molecules. The C—O stretching vibration at 1050 cm$^{-1}$ shows the presence of epoxy groups.

EXAMPLE 7

Transmission Electron Microscopy of HGQDPEG

Figure 5:
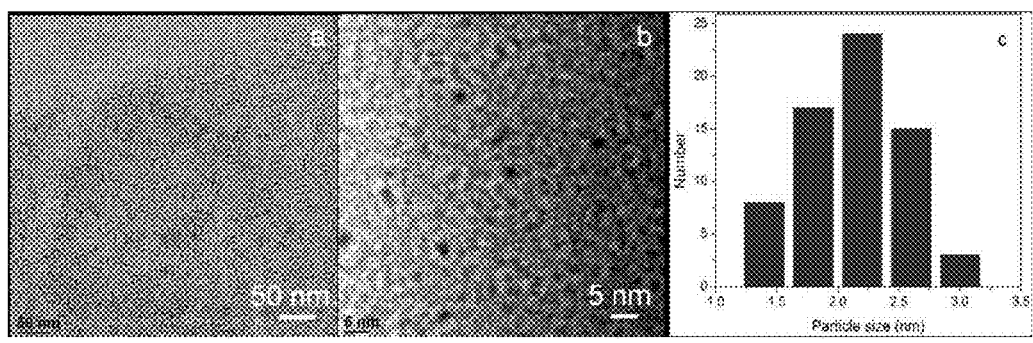
FIG. 5a shows High resolution transmission electron microscopy image of HGQDPEG low magnification.
FIG. 5b shows High resolution transmission electron microscopy image of HGQDPEG high magnification.
FIG. 5c shows HGQDPEG particle size distribution.

High resolution TEM images of HGQDPEG are shown in FIGS. 5(*a* & *b*). A bar diagram for the size distribution of GQDs is shown in FIG. 5*c*. The particle size is nearly uniform and the average size is about 2.2 nm.

EXAMPLE 8

Absorption Analysis of Dialyzed HGQDPEG

Figure 6:
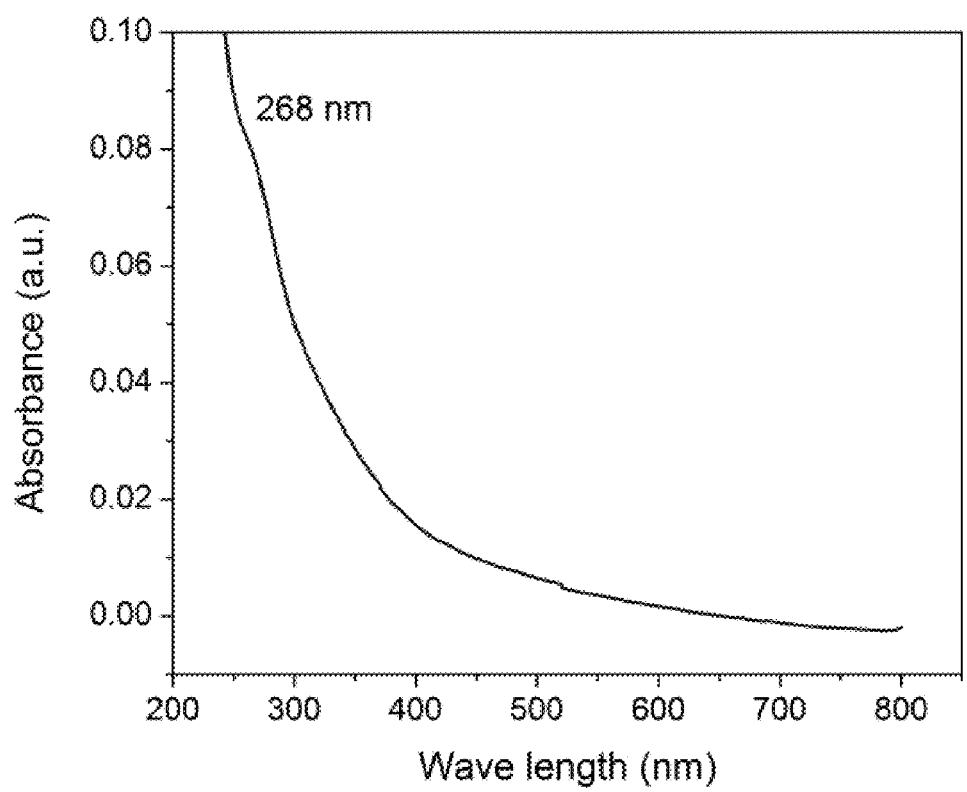
FIG. 6 shows UV-vis absorption spectrum of the dia HGQDPEG dispersed in water. The Y-axis represents absorbance (arbitrary units) and the X-axis represents the wavelength (nm).
Figure 7A:
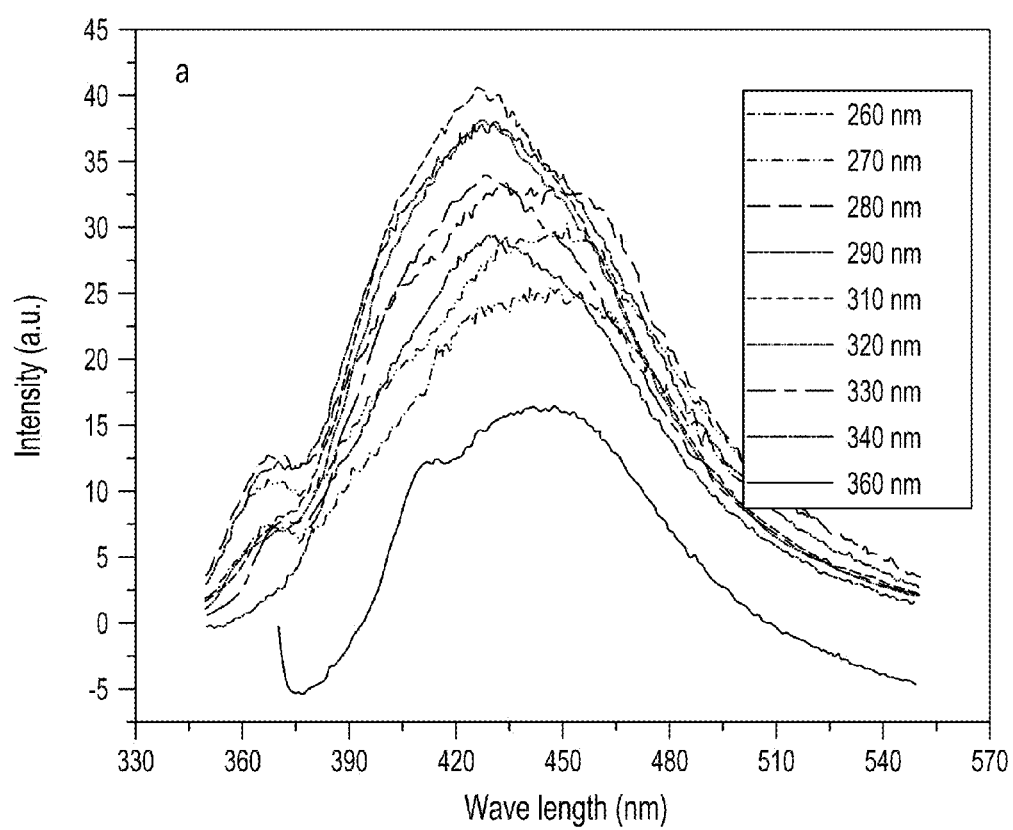
FIG. 7a shows PL spectra of dia HGQDPEG at different excitation wave length. The Y-axis represents intensity (arbitrary units) and the X-axis represents the wavelength (nm).
Figure 7B:
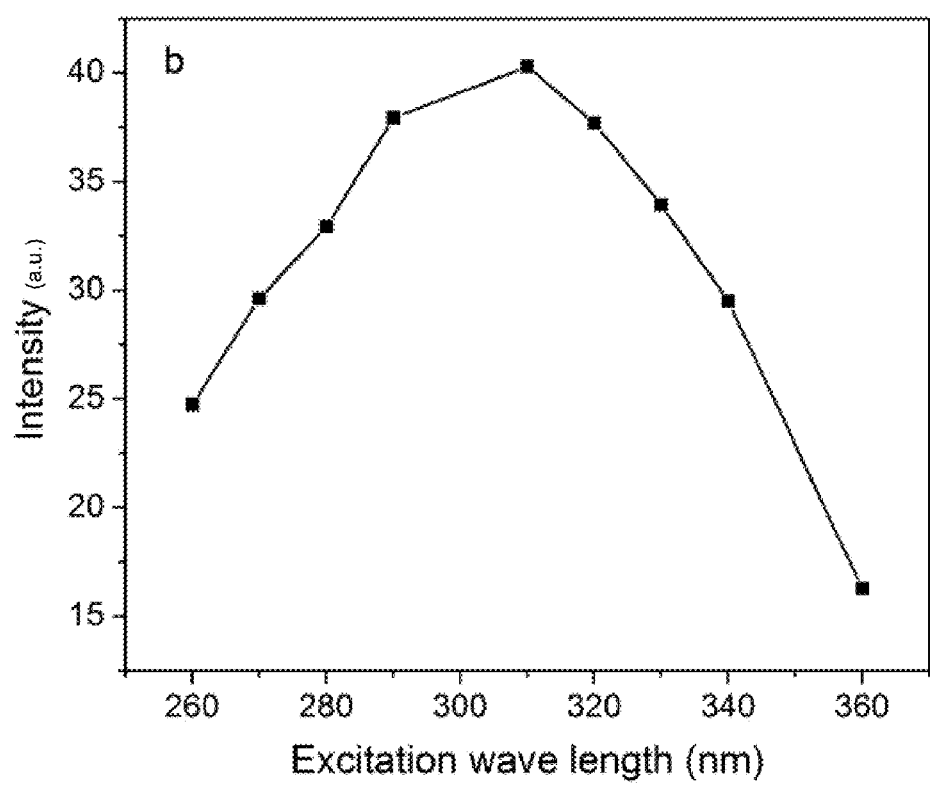
FIG. 7b shows variation of intensity of emission wave length with respect to excitation wave length. The Y-axis represents intensity (arbitrary units) and the X-axis represents the excitation wavelength (nm).

FIG. 6 shows the absorption spectrum of dia HGQDPEG. An absorption peak has been observed around 268 nm. Further, PL spectra have been taken for different excitation wavelengths. FIG. 7(*a*) shows the emission spectra taken for different excitation wave length starting from 260 nm. The peak of the emission wavelength is in between 440-450 nm. FIG. 7(*b*) shows the variation of intensity of emission wavelength with respect to excitation wave length. The intensity increases when excitation wave length increases and reaches a maximum and then decreases when excitation wave length increases further.

EXAMPLE 9

X-Ray Diffraction Analysis of GQDPEGCNT

Figure 8:
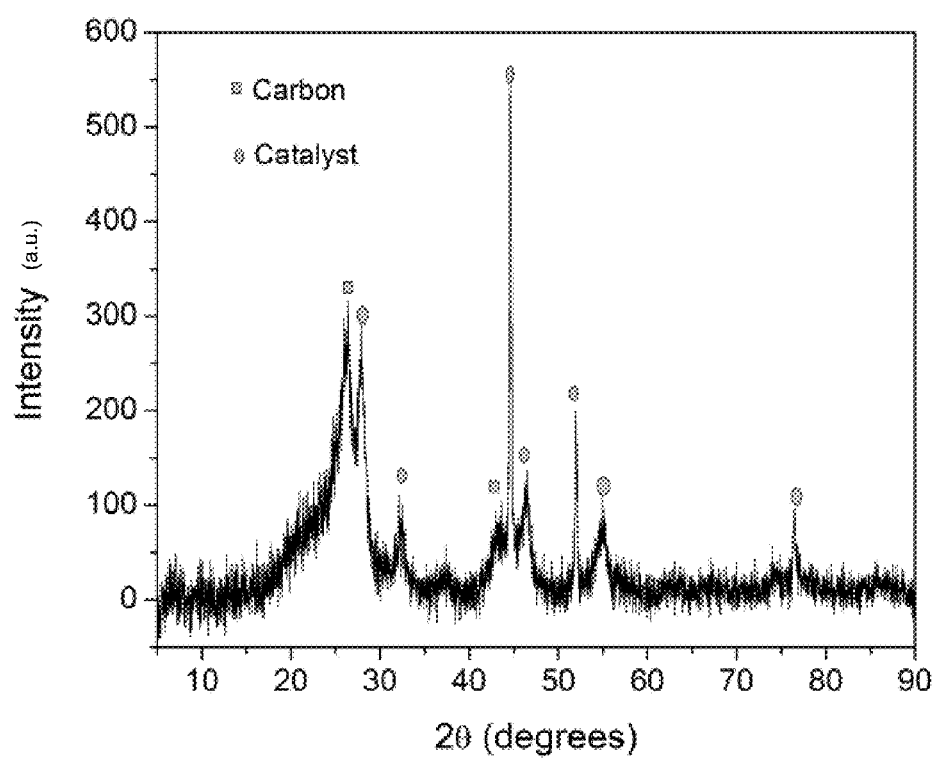
FIG. 8 shows X-ray diffraction pattern of GQDPEGCNT. The Y-axis represents diffracted x-ray intensity (arbitrary units) and the X-axis represents the detector angle (2-theta; degrees).
Figures 9A, 9B, 9C:
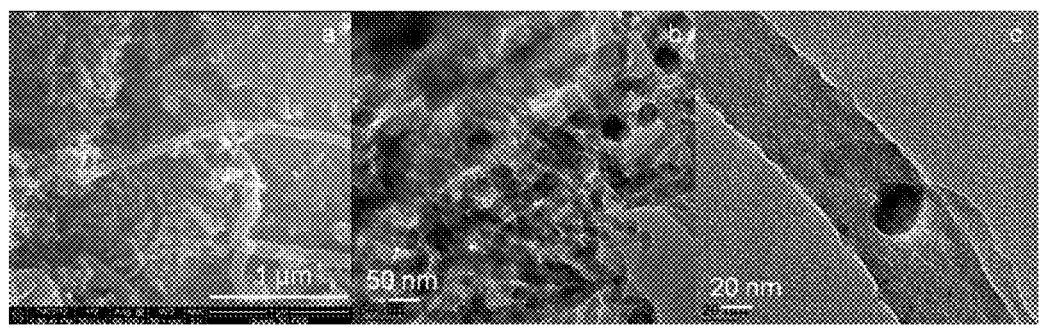
FIG. 9a shows GQDPEGCNT FESEM image.
FIG. 9b shows GQDPEGCNT TEM image.
FIG. 9c shows GQDPEGCNT HRTEM image.

FIG. 8 shows the XRD pattern of GQDPEGCNT. The broad peak around 26° is due to GQD and CNT formation. All other peaks appeared in the XRD pattern is due to the MmNi3 catalyst. Field emission scanning electron microscopy image of GQDPEGCNT is given in FIG. 9*a*, CNTs present in the sample can be seen in the image. But, since the GQDs size is less than 50 nm, GQDs are not visible in the picture. The TEM and HRTEM images of GQDPEGCNT are seen in FIGS. 9(*b* and *c*).

With respect to the use of substantially any plural and/or singular terms herein, those having skill in the art can translate from the plural to the singular and/or from the singular to volume of wastewater can be received in the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

TABLE 1

Summary of D-band, G-band and intensity ratio of D-band to G-band ($I_D/I_G$)

| Sample | D-band (cm$^{-1}$) | G-band (cm$^{-1}$) | $I_D/I_G$ |
|---|---|---|---|
| GO | 1360 | 1601 | 1.03 |
| f-GO | 1357 | 1593 | 1.08 |
| f-GO PEG | 1333 | 1566 | 0.98 |
| HGQDPEG | 1341 | 1578 | 0.98 |
| SGQDPEG | 1340 | 1577 | 0.89 |
| VGQDPEG | 1341 | 1578 | 0.84 |

What is claimed is:

1. A method of making zero dimensional graphene quantum dots (0-D GQDs), the method comprising:
   placing graphite oxide (GO) in a furnace, wherein the graphite oxide is surface passivated by polyethylene glycol under sonication to form a functionalized graphite oxide (f-GO PEG);
   flushing the furnace with an inert gas at a temperature of about 20° C. to about 30° C. for about 15 minutes;
   introducing hydrogen ($H_2$) into the furnace at a temperature of about 18° C. to about 33° C.;
   heating the functionalized graphite oxide at about 200° C. in the presence of hydrogen ($H_2$); and
   cooling the furnace to room temperature.

2. The method of claim 1, wherein the inert gas is argon (Ar).

3. The method of claim 1, further comprising dispersing the 0-D GQDs in water and dialyzing to separate pure 0-D GQDs from unreacted GO.

4. The method of claim 1, wherein the heating at 200° C. is performed for at least 30 minutes.

5. The method of claim 1, wherein the 0-D GQDs are water soluble.

6. The method of claim 1, wherein the 0-D GQDs emit blue light upon exposure to UV light.

7. The method of claim 1, wherein the 0-D GQDs are biocompatible.

8. The method of claim 1, wherein the graphite oxide used to make the zero dimensional graphene quantum dots (0-D GQDs) is dried in a heated vacuum oven prior to practicing the method of claim 1.

9. The method of claim 8, wherein the heated vacuum oven is held at 50° C.

10. A method of making a composite of zero dimensional graphene Quantum Dots (0-D GQD) and one dimensional carbon nanotubes (1-D CNT), the method comprising:
    placing a mixture of graphite oxide (GO) and $MnNi_3$ in a furnace;
    flushing the furnace with an inert gas;
    introducing hydrogen ($H_2$) into the furnace;
    heating the mixture to about 200° C. in the presence of hydrogen for about 5 minutes;
    heating the mixture to about 700° C.;
    introducing acetylene to the furnace; and
    cooling the furnace to room temperature.

11. The method of claim 10, wherein the inert gas is argon (Ar).

12. The method of claim 10, wherein flushing the furnace with argon is for about 15 minutes.

13. The method of claim 10, wherein flushing the furnace with an inert gas is performed at about a temperature of 20° C.-30° C.

14. The method of claim 10, wherein the mixture is heated with acetylene for about 20 minutes.

15. The method of claim 10, wherein the method also produces two-dimensional graphene sheets.

16. The method of claim 10, further comprising dispersing the 0-D GQDs in water and dialyzing to isolate 0-D GQDs.

17. The method of claim 10, wherein the dried graphite oxide (GO) and $MnNi_3$ are ground.

18. The method of claim 10, wherein the 0-D GQDs emit blue light upon exposure to UV light.

19. The method of claim 10, wherein the 0-D GQDs are biocompatible.

20. The method of claim 10, wherein the dried graphite oxide (GO) is dried in a heated vacuum oven prior to practicing the method of claim 10.

21. The method of claim 20, wherein the heated vacuum oven is held at 50° C.

22. The method of claim 10, wherein the graphite oxide is functionalized graphite oxide (f-GO).

23. The method of claim 22, wherein the graphite oxide is surface passivated functionalized graphite oxide (f-GO PEG).

24. The method of claim 23, wherein the surface passivated functionalized graphite oxide (f-GO PEG) is manufactured under sonication.

25. The method of claim 23, wherein the 0-D GQDs are water soluble.

26. The method of claim 23, wherein the 0-D GQDs are biocompatible.

* * * * *

UNITED STATES PATENT AND TRADEMARK OFFICE
CERTIFICATE OF CORRECTION

PATENT NO.       : 9,926,202 B2
APPLICATION NO.  : 14/912363
DATED            : March 27, 2018
INVENTOR(S)      : Sundara et al.

It is certified that error appears in the above-identified patent and that said Letters Patent is hereby corrected as shown below:

In the Specification

Column 4, Line 45, delete "as with hydrogen gas ($H_2$), in" and insert -- gas with hydrogen gas ($H_2$). In --, therefor.

Column 5, Line 9, delete "soluble, in" and insert -- soluble. In --, therefor.

Column 6, Lines 31-32, delete "mbar, in" and insert -- mbar. In --, therefor.

Column 6, Line 40, delete "light in" and insert -- light. In --, therefor.

Column 7, Line 8, delete "bout 30° C." and insert -- about 30° C. --, therefor.

Column 7, Line 16, delete "about 210" and insert -- about 210, --, therefor.

Column 8, Line 65, delete "268 nm for" and insert -- 268 nm (for --, therefor.

Column 9, Line 5, delete "about 279" and insert -- about 279, --, therefor.

Column 10, Line 13, delete "value in" and insert -- value), in --, therefor.

Column 12, Line 22, delete "The flow" and insert -- The $H_2$ flow --, therefor.

Column 12, Line 39, delete "sample, Fig. 2*b*" and insert -- sample. Fig. 2*b* --, therefor.

Column 14, Line 20, delete "embedded." and insert -- embedded --, therefor.

Column 15, Line 63, delete "recitation no" and insert -- recitation, no --, therefor.

Signed and Sealed this
Fifth Day of June, 2018

Andrei Iancu
*Director of the United States Patent and Trademark Office*

Column 16, Line 17, delete "general such" and insert -- general, such --, therefor.

Column 16, Line 25, delete "general such" and insert -- general, such --, therefor.